(12) United States Patent
Tseng et al.

(10) Patent No.: US 7,561,340 B2
(45) Date of Patent: Jul. 14, 2009

(54) TUNABLE MICRO-ASPHERICAL LENS AND MANUFACTURING METHOD THEREOF

(75) Inventors: Fan Gang Tseng, Hsinchu (TW); Chang Wei Chen, Taipei (TW)

(73) Assignee: National Tsing Hua University, Hsinchu (TW)

( * ) Notice: Subject to any disclaimer, the term of this patent is extended or adjusted under 35 U.S.C. 154(b) by 256 days.

(21) Appl. No.: 11/415,513

(22) Filed: May 2, 2006

(65) Prior Publication Data
US 2007/0121213 A1 May 31, 2007

(30) Foreign Application Priority Data
Nov. 29, 2005 (TW) ............... 94141860 A

(51) Int. Cl.
*G02B 1/06* (2006.01)
*G02B 26/00* (2006.01)
(52) U.S. Cl. .................. 359/665; 359/291
(58) Field of Classification Search ......... 359/665–667, 359/742
See application file for complete search history.

(56) References Cited
U.S. PATENT DOCUMENTS
7,245,439 B2 * 7/2007 Kuiper et al. ............... 359/665
2005/0218231 A1 * 10/2005 Massieu ................. 235/472.01
2005/0270672 A1 * 12/2005 Feenstra et al. ............. 359/845
2006/0279848 A1 * 12/2006 Kuiper et al. ............... 359/666
2007/0146884 A1 * 6/2007 Shiozaki et al. ............. 359/565

OTHER PUBLICATIONS

D.W. De Lima Monteiro et al., "Single-mask microfabrication of aspherical optics using KOH anisotropic etching of Si," Optics Express, Sep. 2003, vol. 11, No. 18, Delft University of Technology, The Netherlands.
Nikolas Chronic et al., "Tunable liquid-filled microlens array integrated with microfluidic network," Optics Express, Sep. 2003, vol. 11, No. 19, University of California at Berkley, Berkly, CA.
Chang-Wei Chen et al., "Tunable Micro-Aspherical Lens Manipulated by 2D Electrostatic Force," The 13th International Conference on Solid-State Sensors, Actuators and Microsystems, Jun. 5-9, 2005, Seoul, Korea.

* cited by examiner

Primary Examiner—Jordan M. Schwartz
(74) Attorney, Agent, or Firm—Egbert Law Offices PLLC

(57) ABSTRACT

A tunable micro-aspherical lens is disclosed, which employs two potential differences provided by two sets of electrodes to dynamically change the bottom area and the central height of the liquid polymer lens. The tunable micro-aspherical lens includes a tunable lens, a lower electrode plate, a hydrophobic pattern, an insulation layer and an upper transparent electrode plate. Also, a manufacturing method of a tunable micro-aspherical lens is disclosed, which includes forming a lower electrode plate, forming an insulation layer, determining a position of the tunable lens, controlling the bottom area and the central height of the tunable lens. The tunable micro-aspherical lens of the present invention eliminates spherical aberration and improves the focus spot resolution to shrink the focus spot and thus to provide better optical quality.

23 Claims, 4 Drawing Sheets

TUNABLE MICRO-ASPHERICAL LENS AND MANUFACTURING METHOD THEREOF

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a tunable micro-aspherical lens and a manufacturing method thereof, and more particularly, to a tunable micro-aspherical lens and a manufacturing method thereof based on two-dimensional electrostatic modulation technology, which is especially suitable for optical fiber communication, display, biomedical diagnosis and optical storage equipment.

BACKGROUND OF THE INVENTION

Recently, there has been rapid growth in the use of various optoelectronic products. Optoelectronic products require an optical interface to communicate between the human and the optoelectronic product or require an optical device installed within the optoelectronic product such as an LCD display and a digital camera. Due to decreasing sizes of optoelectronic products, not only do the manufacturing processes of related circuits need to advance, but also the size of related optical parts needs to decrease accordingly. If a traditional optical device is forced to meet the requirement of current portable products, its advantages, such as weight and convenience, will be lost. Therefore, MEMS technology and precise machining are both utilized in optical devices in portable products, since there is no difference between the utilizations of light scale by micro-optics and by traditional optics. In particular, MEMS technology is capable of batch and mass production and thus suitable for manufacturing of current portable consumer products.

Currently the microlens is commonly used in the systems of optical fiber communication, display, biomedical diagnosis and optical storage equipment. Focus spot resolution provided by the microlens determines the performance of the systems. However, an adequate focus spot resolution provided by a general microlens cannot be obtained due to spherical aberration, and in micro optical systems the issue of spherical aberration cannot be resolved by the combination of plural spherical lenses. Therefore, it is necessary to develop the micro-aspherical lens to provide better optical quality.

The manufacturing of traditional large-scale lenses, including spherical lenses and aspherical lenses, can be achieved by precise machining under tight controls. When the size of the lens shrinks down to a scale of a micro-system ranging from centimeters to sub micron, a delicate control method is required and the manufacturing process is time-consuming if a traditional machining process is used to manufacture a micro-aspherical lens.

In 2003, D. W. de Lima Monteiro et al. (refer to "Single-mask microfabrication of aspherical optics using KOH (potassium hydroxide) anisotropic etching of Si", OPTICS EXPRESS, Vol. 11, No. 18, 8 Sep. 2003) proposed a method to fabricate a micro-aspherical lens using a single-mask and anisotropic etching. The method needs to consider the issue of surface roughness and the rounded profile after KOH anisotropic etching approximates an aspherical lens. However, this method can be used for batch production of reflective and refractive aspherical surfaces. Once the lens is fabricated by this method, with a fixed shape, it cannot subsequently be modulated to change its optical characteristic.

In another prior art, Nikolas Chronis et al. (refer to "Tunable liquid-filled microlens array integrated with microfluidic network", OPTICS EXPRESS, Vol.11, No. 19, 22 Sep. 2003) proposed a pneumatic microlens whose focal length is dynamically adjusted by pneumatically controlling the pressure with the microfluidic network. In this method, a microfluidic network is integrated on the bottom of the array to deliver and pressurize the liquid into the circular chambers that are pre-filled with any liquid whose index of refraction is equal or higher than that of PDMS (polydimethylsiloxane) in order for a positive plano-convex lens array to be formed. A pneumatic pump having a pressure regulator is used to inflate the PDMS membrane. However, the tunable micro-aspherical lens with a pneumatic pump is not compatible to general optoelectronic products and the tunable range is limited to one dimension, resulting in spherical aberration at the edge.

Philips (refer to http://www.research.philips.com/newscenter/archive/2004/fluidlenses.html) provides a variable-focus lens system using the interface of two immiscible fluids of different refractive indices and electrowetting effect. The modulation of a lens by electric field is proved to be feasible by commercialization of Philips' variable-focus system; however, the tunable range thereof is limited to one dimension.

To meet rapid growth and miniaturization of consumer products, the development of new-generation micro optical devices with better optical quality has become a worldwide target. In particular, personal demand for portable optoelectronic products and improvement of the functionality thereof make the large-scaled aspherical lens with improved focus a main product of optical manufacturers. In these times of micro-scaled technology growth, the demand for the micro-aspherical lens is expected to be promising.

BRIEF SUMMARY OF THE INVENTION

The primary objective of the present invention is to provide a tunable micro-aspherical lens and a manufacturing method thereof, wherein the tunable micro-aspherical lens employs two potential differences provided by two sets of electrodes to dynamically change a bottom area of a liquid polymer lens and a central height thereof such that the liquid polymer lens is extended from a sphere to a parabola, even to a cone, to form an aspherical lens. As a result, the difference of the optical path lengths of a central ray (along the optical axis) and peripheral rays (off-axis) is resolved. Thus, spherical aberration is eliminated.

The secondary objective of the present invention is to provide a tunable micro-aspherical lens and a manufacturing method thereof, wherein the liquid polymer lens can self-assemble to a specific position, by the effects of the inhered surface tension of the material of the liquid polymer lens and the interface between hydrophobic and hydrophilic areas. As a result, the liquid polymer lens can collimate a Fresnel diffraction fringe that is enabled to be capable of pre-focusing to form a micro optical device involving diffraction and refraction.

In order to achieve the objectives, the present invention discloses a tunable micro-aspherical lens comprising a liquid polymer lens, a lower electrode plate, a hydrophobic pattern, an insulation layer and an upper transparent electrode plate. The liquid polymer lens is a negative photoresist. The lower electrode plate is used to control a bottom area of the liquid polymer lens and the hydrophobic pattern is used to determine a position of the liquid polymer lens. The upper transparent electrode plate is used to control a curved surface of the liquid polymer lens.

As for the manufacturing method of the tunable micro-aspherical lens, first, a lower electrode plate is formed comprising a Fresnel diffraction fringe pattern. The Fresnel diffraction fringe pattern is made of metal and formed by a lift-off process, which is commonly used in MEMS technology. Second, an insulated layer is formed above the lower electrode plate. Third, a hydrophobic pattern is formed, using the lift-off process, above the insulation layer. However, the surface characteristic of the hydrophobic layer is different from that of the insulation layer. The hydrophobic pattern defines a hydrophilic area that collimates the Fresnel diffraction fringe pattern of the lower electrode plate. Consequently, when a droplet of liquid photoresist is dropped near the hydrophilic area, it will self-assemble (i.e., self-position), due to different surface tensions with respect to different surface characteristics, to the hydrophilic area and then collimate the Fresnel diffraction fringe pattern. Presently, the drop of liquid photoresist exhibits a spherical curvature and is transparent; thus, it can be used as a liquid polymer lens. To achieve the object of the present invention, eliminating the spherical aberration to enhance the focusing spot performance, a first potential difference is applied on the Fresnel diffraction fringe pattern to control the bottom area of the liquid polymer lens using electrowetting effect. At the same time, a second potential difference is applied on the upper transparent electrode plate to attract and control the central height of the liquid polymer lens using the electrostatic effect. Accordingly, a tunable micro-aspherical lens is formed. In addition, the liquid polymer lens can absorb an external energy to condense to form a solid micro-aspherical lens.

BRIEF DESCRIPTION OF THE SEVERAL VIEWS OF THE DRAWINGS

The invention will be described according to the appended drawings.

DETAILED DESCRIPTION OF THE INVENTION

Figure 1:
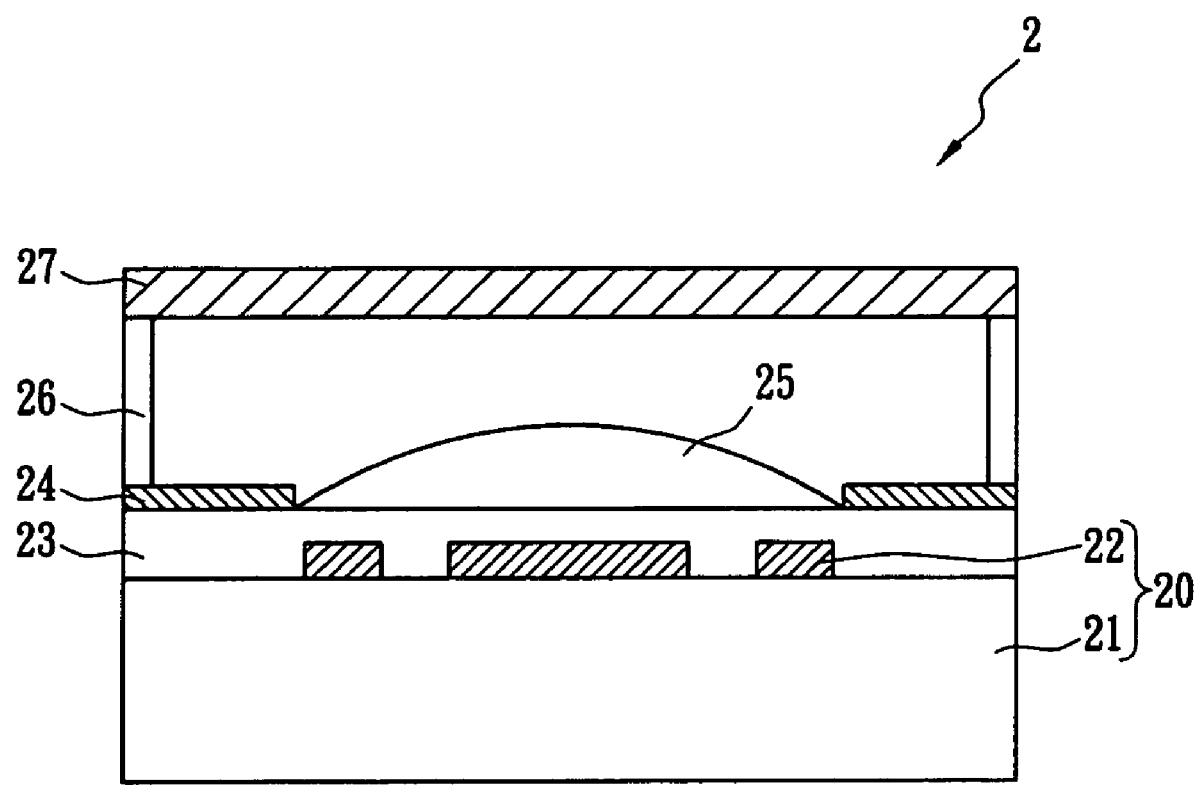
FIG. 1 illustrates the cross-section view of one embodiment of the tunable micro-aspherical lens of the present invention.

FIG. 1 illustrates the cross-section view of one embodiment of the tunable micro-aspherical lens 2 of the present invention. The tunable micro-aspherical lens 2 comprises a transparent substrate 21, a Fresnel diffraction fringe pattern 22, an insulation layer 23, a hydrophobic pattern 24, a liquid polymer lens 25, a spacer 26 and an upper transparent electrode plate 27. The transparent substrate 21 and the Fresnel diffraction fringe pattern make up a lower electrode plate 20. When an incident light passes through the transparent substrate 21, it is pre-focused and collimated by the Fresnel diffraction fringe pattern 22 first and then refracted by the liquid polymer lens 25. Finally, it is focused after transmitting the upper transparent electrode plate 27.

The manufacturing method of a tunable micro-aspherical lens of the present invention is described in detail below. Step one is to form a lower electrode plate 20 comprising a Fresnel diffraction fringe pattern 22 that is used as a collimator and for focusing, and a transparent substrate 21. The transparent substrate 21 is cleaned with the mixture of sulfuric acid and hydrogen peroxide. Then, a first thin photoresist is spin-coated on the transparent substrate 21. After exposure and development, a complementary pattern of the Fresnel diffraction fringe pattern 22 is formed. In the current embodiment, glass is used as the transparent substrate 21 due to its low cost and better optical characteristics. Afterward, a metal film (aluminum is used in the current embodiment) of thickness about 3000 angstroms is evaporated onto the transparent substrate 21 to become the body of the Fresnel diffraction fringe pattern 22 after a lift-off process. Next, the transparent substrate 21 is soaked in a solvent to remove the first thin photoresist and the metal film thereon. Accordingly, the Fresnel diffraction fringe pattern 22 is formed on the transparent substrate 21 and the lower electrode plate 20 is formed. Any electrically conductive material can be used for the material of the Fresnel diffraction pattern 22, and thus it is not limited to metal.

Figure 2:
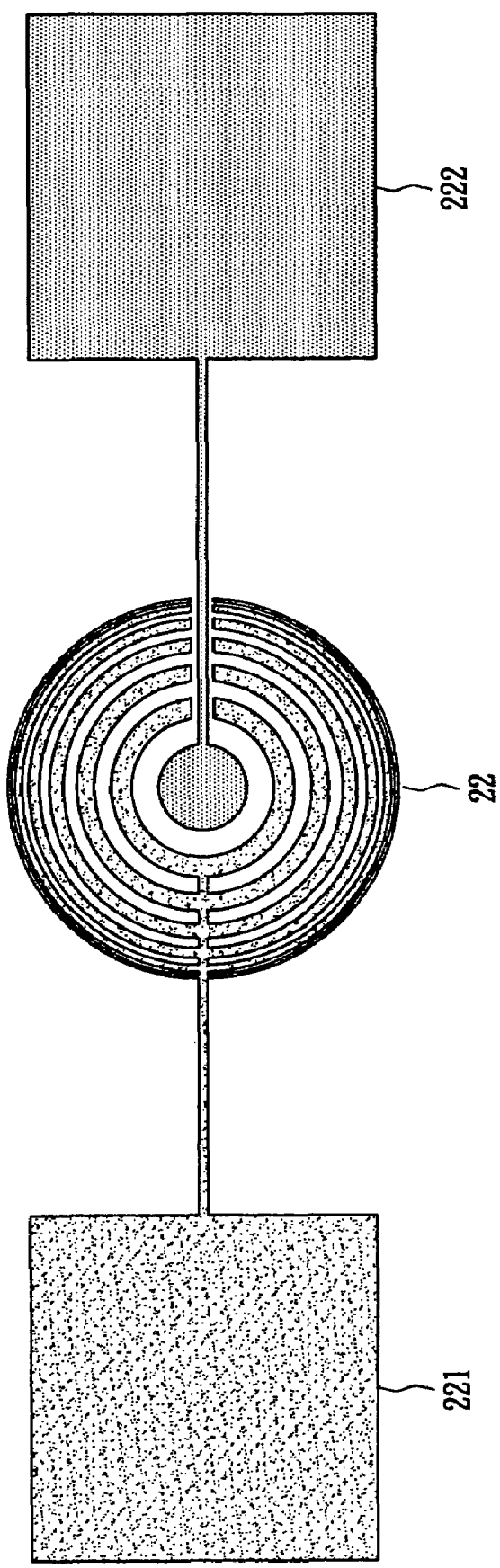
FIG. 2 shows a schematic view of a lower electrode plate comprising a Fresnel diffraction fringe pattern and two pads.

FIG. 2 shows the lower electrode plate 20 comprising the Fresnel diffraction fringe pattern 22, a first pad 221 and a second pad 222. Note that the transparent substrate 21 is not shown in FIG. 2. The first pad 221 is connected electrically to plural concentric circles except a central point, and the second pad 222 is connected electrically to the central point only. The first and the second pads 221, 222 are insulated electrically. The first pad 221 is connected to a voltage source and the second pad 222 is grounded to provide a first potential difference in between. Therefore, the bottom area of the liquid polymer lens 25 on the lower electrode plate 20 will change due to an electrowetting effect. Since the Fresnel diffraction fringe pattern 22 acts as an electrode to receive the voltage source in operation, it is also called the Fresnel zone plate.

Step two is to from an insulation layer 23 above the lower electrode plate 20. The insulation layer 23 of thickness of 5000 angstroms is deposited by a chemical vapor deposition process (e.g., PECVD) above the Fresnel zone plate 22 and the transparent substrate 21. Next, a second thin photoresist is coated as an etch mask. Then, the insulation layer 23 over the two pads 221 and 222 is removed by RIE (reactive ion etching) to allow the two pads 221 and 222 to connect to the voltage source. Now entering Step three, after the second thin photoresist is removed, a third thin photoresist is coated to form a cylindrical photoresist on the Fresnel diffraction fringe pattern 22 above which the liquid polymer lens 25 will be disposed. Next, a Teflon solution is spin-coated onto the insulation layer 23 and baked in a heater to enhance the structure thereof. Finally, the third thin photoresist is removed to make the area, which will be disposed by the liquid polymer lens 25, hydrophilic and to make the other area, covered by Teflon, hydrophobic. As a result, the hydrophobic pattern 24 is formed. At Step three, the hydrophobic pattern 24 is formed above the insulation layer 23 and the hydrophobic pattern 24 is used to determine the position of the tunable lens 25 (i.e., the position of the liquid polymer lens). In the current embodiment, the liquid polymer lens 25 is a liquid SU-8 that is a negative photoresist. When the liquid SU-8 droplet drops on the hydrophobic pattern 24, it will self-assemble (i.e., self-position), due to different surface tensions with respect to different surface characteristics, to the hydrophilic area and then collimate to the Fresnel diffraction fringe pattern 22.

Afterwards, the upper transparent electrode plate 27, made of indium tin oxide in the current embodiment, is placed above the hydrophobic pattern 24 and the SU-8 droplet. The upper transparent electrode plate 27 is connected to a voltage source to form a second potential difference with respect to the pad 222 of the lower electrode plate 20 to control the central height (equivalent to the curved surface) of the SU-8 droplet 25.

FIGS. 3(a) through 3(d) and FIGS. 4(a) through 4(e) illustrate the profiles of the tunable lens of the present invention under different first and second potential differences. The first and second potential differences applied are shown in Tables 1 and 2 below.

TABLE 1

| Figure | First potential difference (V) | Second potential difference (V) |
|---|---|---|
| 3-(a) | 0 | 0 |
| 3-(b) | 300 | 0 |
| 3-(c) | 300 | 900 |
| 3-(d) | 300 | 1500 |
| 3-(e) | 300 | 2000 |

TABLE 2

| Figure | First potential difference (V) | Second potential difference (V) |
|---|---|---|
| 4-(a) | 0 | 0 |
| 4-(b) | 200 | 0 |
| 4-(c) | 200 | 600 |
| 4-(d) | 200 | 900 |
| 4-(e) | 200 | 1500 |

Figure 3A:
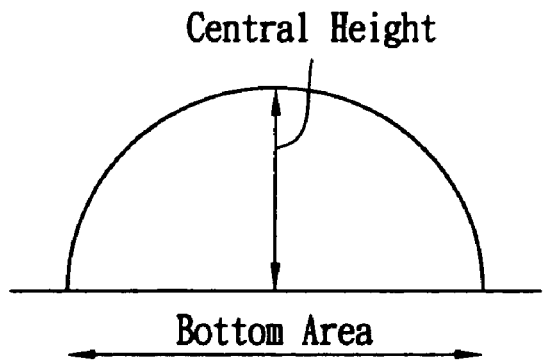
FIGS. 3(a) through 3(e) are graph illustrations of the profiles of the tunable lens of the present invention under different first and second potential differences.
Figure 3B:
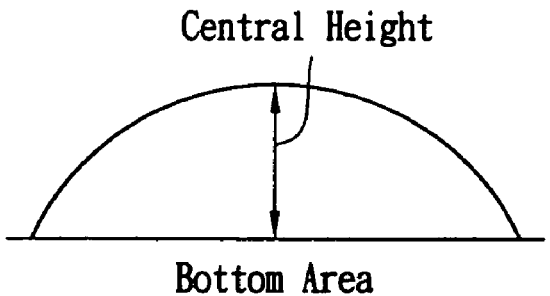
Figure 3C:
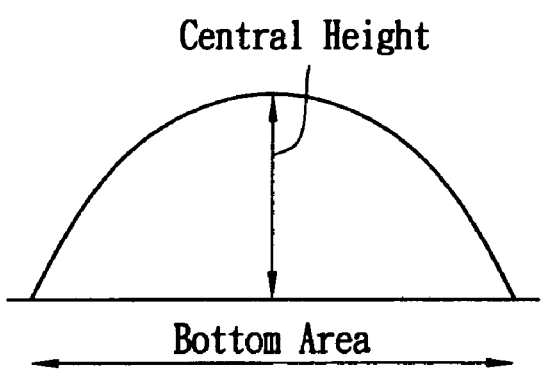
Figure 3D:
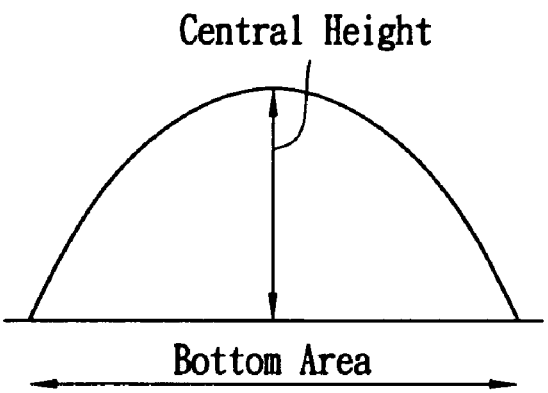
Figure 3E:
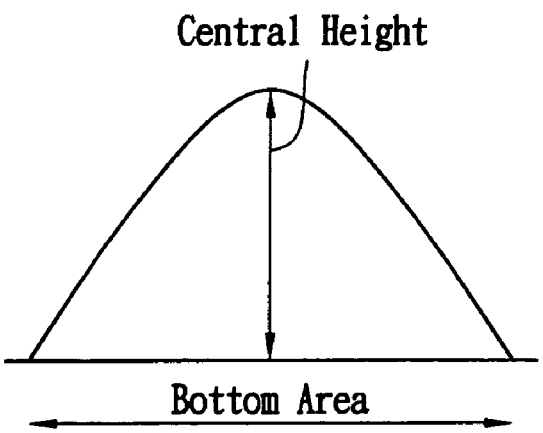
Figure 4A:
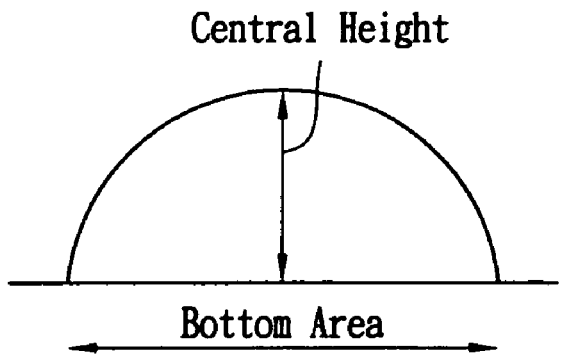
FIGS. 4(a) through 4(e) are graph illustrations the profiles of the tunable lens of the present invention under different first and second potential differences.
Figure 4B:
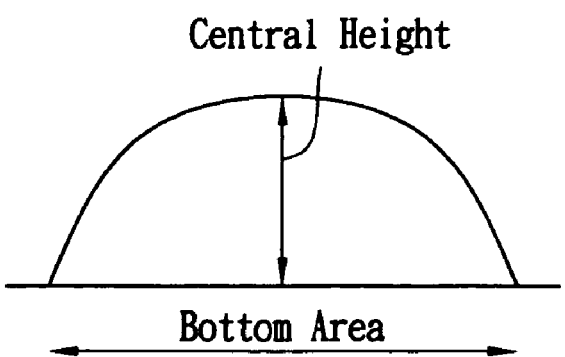
Figure 4C:
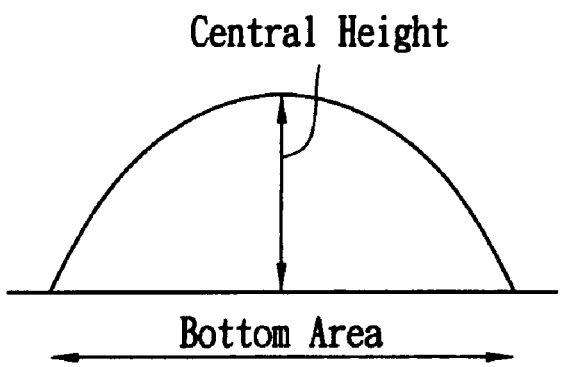
Figure 4D:
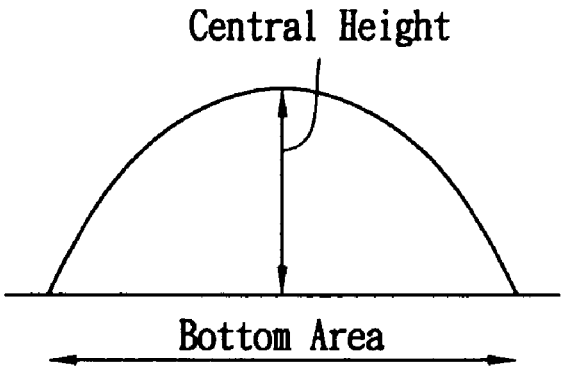
Figure 4E:
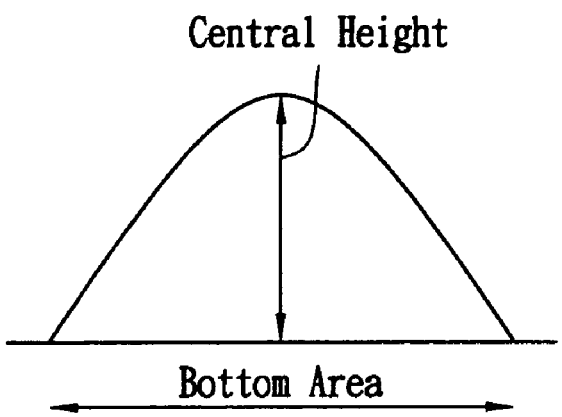

The actuation of the tunable micro-aspherical lens of the present invention is described below. Referring to FIG. 1, first, a first potential difference is applied to the Fresnel zone plate 22 and the bottom area of the liquid polymer lens 25 is increased due to an electrowetting effect (refer to FIGS. 3(a)-3(b) and FIGS. 4(a)-4(b)). Comparing FIG. 3(b) to FIG. 4(b), the bottom area of FIG. 3(b) is larger than that of FIG. 4(b) due to larger first potential difference applied. Second, a second potential difference is applied between the upper transparent electrode plate 27 and the low electrode plate 20. The electrostatic force at the center of the liquid polymer lens 25 is stronger than that along periphery thereof due to the relationships among the electrostatic force, the shape of the liquid polymer lens 25 and the distribution of potential. Accordingly, an originally spherical shape of the liquid polymer lens 25 is extended to an aspherical shape (refer to FIGS. 3(b)-(e) and FIGS. 4(b)-(e)).

The tunable micro-aspherical lens employs a two-dimension electrostatic modulation technology, using attractive electrostatic force and electrowetting effect, to control the central height and the bottom area of the liquid polymer lens. In addition, a Fresnel diffraction fringe pattern is designed on the lower electrode plate to pre-focus the incident light to provide a better optical quality, which could not be achieved by micro-optical systems in the past. That is, the tunable micro lens of the present invention can obtain a smaller focus spot. Additionally, the present invention provides a self-assembling mechanism, which is utilized for the collimation of the liquid polymer lens to the Fresnel diffraction fringe pattern. Also, the present invention is an optical device comprising diffraction and refraction micro optical elements (i.e., the Fresnel diffraction fringe pattern and the liquid polymer lens, respectively) and can absorb an external energy (e.g., UV light or heat) to condense to a solid micro-aspherical lens. According to the description above, the present invention can achieve the expected objectives of elimination of spherical aberration, and self-assembly of the liquid polymer lens to form a micro optical device involving diffraction and refraction.

The liquid polymer lens used in the tunable micro-aspherical lens of the present invention dynamically changes the bottom area and the central height thereof, using two potential differences provided by two sets of electrodes. As a result, the liquid polymer lens is not limited to the SU-8 negative photoresist mentioned in the above embodiment. Any lens exhibiting the capability of dynamically changing appearance, such as a liquid material lens, a fluid-filled lens surrounded by a solid film, a flexible solid lens and a fluid-filled lens surrounded by a liquid film, can be used in the present invention. Note that the fluid includes a gas and a liquid.

The above-described embodiments of the present invention are intended to be illustrative only. Numerous alternative embodiments may be devised by those skilled in the art without departing from the scope of the following claims.

We claim:

1. A tunable micro-aspherical lens comprising:
   a tunable lens within a single enclosure;
   a lower electrode plate having a plurality of concentric ring-shaped first electrodes and a second electrode surrounded by the concentric ring-shaped first electrodes, said lower electrode plate controlling a bottom area of said tunable lens and being disposed under said tunable lens, said plurality of concentric ring-shaped first electrodes and said second electrode forming a Fresnel diffraction fringe pattern located in its entirety under said turnable lens;
   a hydrophobic pattern determining a position of said tunable lens; and
   an upper transparent electrode plate controlling a curved surface of said tunable lens and being disposed above said tunable lens and said hydrophobic pattern.

2. The tunable micro-aspherical lens of claim 1, wherein the Fresnel diffraction fringe pattern is comprised of an electrically conductive material.

3. The tunable micro-aspherical lens of claim 1, wherein a potential difference is applied on said lower electrode plate to control said bottom area of said tunable lens using an electrowetting effect.

4. The tunable micro-aspherical lens of claim 1, wherein said lower electrode plate is suitable for pre-focusing and collimating light.

5. The tunable micro-aspherical lens of claim 1, further comprising:
   an insulation layer disposed above said lower electrode plate, said insulation layer having a surface characteristic thereof different from a surface characteristic of said hydrophobic pattern.

6. The tunable micro-aspherical lens of claim 1, wherein the hydrophobic pattern is defined by a lift-off process.

7. The tunable micro-aspherical lens of claim 1, wherein said hydrophobic pattern defines a hydrophilic area collimating the Fresnel diffraction fringe pattern.

8. The tunable micro-aspherical lens of claim 1, wherein the Fresnel fringe diffraction pattern is defined by a lift-off process.

9. The tunable micro-aspherical lens of claim 1, wherein said tunable lens is a negative photoresist.

10. The tunable micro-aspherical lens of claim 1, wherein a potential difference is applied on said upper transparent electrode plate so as to control said curved surface of said tunable lens by an electrostatic effect.

11. The tunable micro-aspherical lens of claim 1, wherein said tunable lens absorbs an external energy so as to condense to form a solid micro-aspherical lens.

12. The tunable micro-aspherical lens of claim 1, wherein said upper transparent electrode plate is comprised of indium tin oxide.

13. The tunable micro-aspherical lens of claim 1, wherein the lower electrode plate comprises:
   a first pad connecting electrically to said plurality of concentric ring-shaped first electrodes; and
   a second pad connecting electrically to said second electrode, wherein said plurality of concentric ring-shaped first electrodes and said second electrode are insulated electrically.

14. The tunable micro-aspherical lens of claim 1, wherein said tunable lens is a liquid polymer lens.

15. The tunable micro-aspherical lens of claim 1, wherein said tunable lens is selected from the group consisting of a liquid material lens, a fluid-filled lens surrounded by a solid film, a flexible solid lens and a fluid-filled lens surrounded by a liquid film.

16. A method of manufacturing comprising the steps of:
   forming a lower electrode plate having a Fresnel diffraction fringe pattern;
   forming an insulation layer above said lower electrode plate;
   forming a hydrophobic pattern above said insulation layer;
   forming a tunable lens on said insulation layer in which said hydrophobic pattern determines a position of said tunable lens;
   providing a first potential difference at said lower electrode plate so as to control a bottom area of the tunable lens; and
   providing a second potential difference between an upper transparent electrode plate and said lower electrode plate so as to control a curved surface of the tunable lens.

17. The method of claim 16, wherein the tunable lens is a negative photoresist.

18. The method of claim 16, wherein said hydrophobic pattern is defined by a lift-off process.

19. The method of claim 16, wherein said insulation layer is formed by chemical vapor deposition.

20. The method of claim 16, wherein the tunable lens self assembles above the Fresnel diffraction fringe pattern.

21. The method of claim 16, wherein the tunable lens is selected from the group consisting of a liquid material lens, a fluid-filled lens surrounded by a solid film, a flexible solid lens, and a fluid-filled lens surrounded by a liquid film.

22. The method of claim 20, wherein the tunable lens self-assembles using a different surface characteristic between the insulation layer and the hydrophobic pattern.

23. The method of claim 16, further comprising the step of: condensing the tunable lens to form a solid micro-aspherical lens.

* * * * *